(12) United States Patent
Ruggeri (10) Patent No.: US 10,419,385 B2
(45) Date of Patent: Sep. 17, 2019

(54) SYSTEMS AND METHODS FOR USE IN TRANSMITTING ELECTRONIC MESSAGES BETWEEN DIFFERENT PROTOCOLS

(71) Applicant: MASTERCARD INTERNATIONAL INCORPORATED, Purchase, NY (US)

(72) Inventor: Daniel Anthony Ruggeri, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 108 days.

(21) Appl. No.: 15/838,059

(22) Filed: Dec. 11, 2017

(65) Prior Publication Data
US 2019/0182201 A1 Jun. 13, 2019

(51) Int. Cl.
G06F 15/16 (2006.01)
H04L 12/58 (2006.01)

(52) U.S. Cl.
CPC .................... *H04L 51/36* (2013.01)

(58) Field of Classification Search
CPC ........................................... H04L 51/36
See application file for complete search history.

(56) References Cited

U.S. PATENT DOCUMENTS

| | | | | |
|---|---|---|---|---|
| 8,457,666 B2 * | 6/2013 | Cai | .......................... | H04L 51/38 455/466 |
| 8,977,238 B2 * | 3/2015 | Cai | .......................... | H04L 51/38 455/411 |
| 2013/0238733 A1 * | 9/2013 | Cai | .......................... | H04L 51/38 709/206 |
| 2014/0222930 A1 * | 8/2014 | Gangadharan | .......... | H04L 51/04 709/206 |
| 2017/0279894 A1 * | 9/2017 | Chen | ....................... | H04L 69/18 |

* cited by examiner

*Primary Examiner* — Krisna Lim
(74) *Attorney, Agent, or Firm* — Harness, Dickey & Pierce, P.L.C.

(57) ABSTRACT

Systems and methods are provided for use in facilitating message communications between a source and at least one recipient. One exemplary method includes receiving, by at least one computing device, a message where the message includes a destination and has a source protocol, normalizing, by the at least one computing device, the message, and converting, by the at least one computing device, the normalized message to a destination protocol associated with the destination. The method further includes transmitting the converted message to the at least one recipient, based on the destination.

20 Claims, 3 Drawing Sheets

SYSTEMS AND METHODS FOR USE IN TRANSMITTING ELECTRONIC MESSAGES BETWEEN DIFFERENT PROTOCOLS

FIELD

The present disclosure generally relates to systems and methods for use in transmitting electronic messages between different protocols (or formats), and in particular, to transmitting electronic messages from source users, in one of multiple different protocols, to recipients, in one of multiple other different protocols.

BACKGROUND

This section provides background information related to the present disclosure which is not necessarily prior art.

Messaging, and specifically, electronic messaging, is known to be available through a variety of different protocols, from email, to social message posts, to web-based forums, to short-message-service (SMS) messages. Often, messaging among users is specific, or consistent, to one protocol. That is, when a user sends an email message to a recipient, the recipient receives the message as an email. Likewise, it is known that when a user posts a message to a social network, the recipient receives the message through the social network, when reviewing a user's profile or otherwise. And, when a user sends a message as an SMS message, the recipient receives the message as an SMS message. That said, it is known to convert certain protocols to certain other protocols. For example, an SMS message may be transmitted as an email to a recipient, when the SMS address is directed to an email address for the recipient. Multiple other types of protocols, however, are not known to be convertible to multiple other protocols.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Messaging is often limited to one protocol, whereby a source user transmits a message in a protocol that is acceptable to a recipient. In so doing, the transmitted message remains in the same protocol. The use of a protocol (e.g., email, SMS, social network posts, chat, instant messaging, etc.) may be limited based on the availability of the given protocol to both users, over another protocol not available to both users. For example, a source user may transmit an SMS message to a recipient, rather than sending the message to the recipient via a preferred chat messenger available only to the source user. Accordingly, source users may be forced to utilize specific, yet not preferred, protocols in messaging recipients. Uniquely, the systems and methods herein permit source users to transmit messages to recipients in one protocol, while the recipients are permitted to receive the messages in another different protocol. In particular, a messaging center includes an ingestion engine, which receives a message from a source user (and intended for a recipient) in one protocol and, if necessary, normalizes the message prior to providing the message to a message engine. The message engine, in turn, identifies a dissemination engine associated with the destination (or recipient) of the message and provides the message to the dissemination engine. Then, the dissemination engine converts the message to a protocol consistent with the destination (and the recipient), and transmits the converted message to the destination (or recipient) via a protocol host and/or a computing device associated with a recipient of the message. By use of the ingestion engine, and more specifically, multiple ingestion engines, a message in almost any protocol (or format) may be received and then, through multiple dissemination engines, transmitted in almost any output protocol. As such, the source user and/or the recipient are not restricted to only common protocols in order to exchange messages, but may each send and/or receive messages in a preferred protocol or type of messaging. This provides efficiencies in transmitting messages to recipients, and essentially overcomes the difficulties often associated with users having different preferred messaging protocols.

Figure 1:
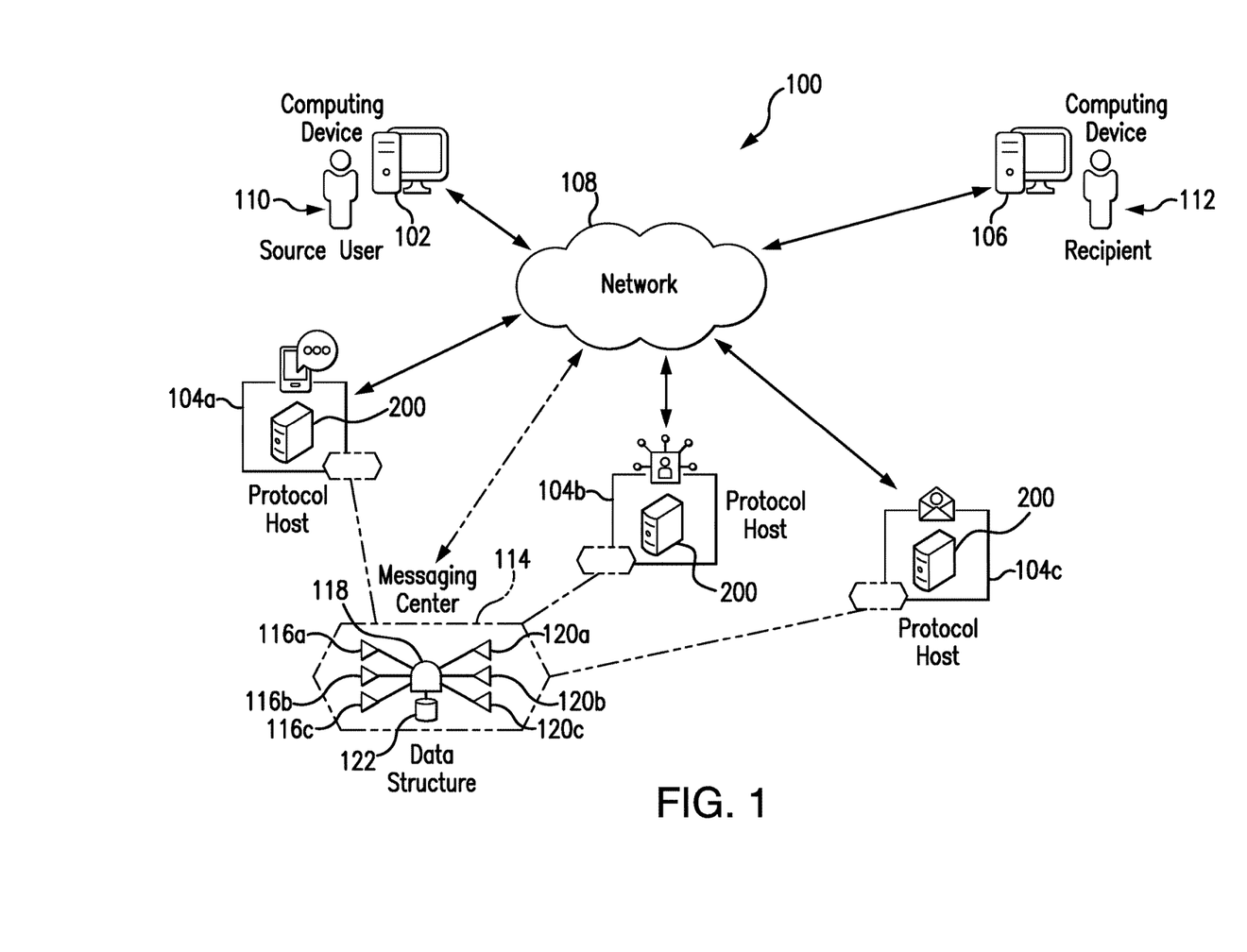
FIG. 1 illustrates an exemplary system of the present disclosure suitable for use in transmitting electronic messages from source users, in certain protocols, to recipients, in certain other different protocol.

FIG. 1 illustrates an exemplary system 100, in which one or more aspects of the present disclosure may be implemented. Although the system 100 is presented in one arrangement, other embodiments may include systems arranged otherwise, depending on, for example, participation of protocol hosts, numbers and/or types of available protocols for sending/receiving messages, etc.

The system 100 generally includes a source computing device 102, multiple protocol hosts 104a-c, and a recipient computing device 106, each coupled to (and in communication with) network 108. The network 108 may include, without limitation, a local area network (LAN), a wide area network (WAN) (e.g., the Internet, etc.), a mobile network, a virtual network, and/or another suitable public and/or private network capable of supporting communication among the parts illustrated in FIG. 1, or any combination thereof.

In this exemplary embodiment, each of the protocol hosts 104a-c is associated with at least one type of messaging, which is initiated by a source user, such as, for example, source user 110, and directed to one or more recipients, such as, for example, recipient 112. The protocol hosts 104a-c may include, without limitation, email hosts, short-message-service (SMS) hosts, social network hosts (e.g., message boards, etc.), chat hosts, bulletin board hosts, etc. The hosts 104a-c are generally associated with providing messaging services and, in this exemplary embodiment, each is associated with a different protocol for carrying a potential message from the source user 110 to the recipient 112.

Specifically, for example, SMS messages may include 160-character messages (e.g., typically in, but not limited to, SMS-CHAR character set encoding; etc.) targeted to one or many international-form telephone numbers (per RFC3966), and may be transported/transmitted via the network 108, for example, in accordance with a global system for mobile communications (GSM) standard.

Email messages may include more robust threaded message formats (e.g., where messages and replies are tied together, etc.) delivered via, for example, the simple mail transfer protocol (SMTP) standard and having metadata associated therewith, in addition to the message body itself (which is generally unrestricted in size). Headers of the email messages may provide the ability to specify features for the messages such as "To," "From,", "CC," "BCC," "Reply-To," etc., as well as additional processing information such as conversation identifiers, content types of the messages and potential SPAM scores of the messages. Email messages may be transmitted via the network 108 over the Internet.

Social network (or social media) messages may include, for example, HTML-based, threaded messages as part of "conversations" containing single subjects and metadata about the conversations, for example, relating to who may view and/or reply to the messages. Each of the social network messages is "addressed" only to the corresponding conversation thread and contains its own metadata such as the identity of the message (from) or other extendable attributes (e.g., reactions, likes, etc.). In connection therewith, social network messages may be delivered via the HTTP protocol through HTML pages or via application programming interface (API) calls to thick client applications.

Message board messages may include messages with similar attributes and behaviors as social network messages, but with the primary differences being that message board systems may rely only on HTTP and HTML rather than API-provided message contents. Additionally, message board messages and related conversations may generally be divided into topics and subtopics, whereas social network conversations are usually "flat" and divided only by the user initiating the conversations.

And, chat messages may include one or more real-time messaging formats delivered via one of various chat protocols (such as, for example, extensible messaging and presence protocol (XMPP) or internet relay chat (IRC), etc.). Depending on the capabilities of the protocol, the chat messages may be limited to ASCII content or may have a full range of HTML/UTF-8 capabilities. Regardless of the protocol, though, each chat message is associated with the identity of the user sending the message and is typically delivered to all "subscribers" of a given chat room and made available to the subscribers in real time.

It should be understood that in the exemplary embodiment of FIG. 1, the protocol host 104a is an SMS host (e.g., a telecommunication provider, etc.), which communicates through a TCP/IP protocol with RFC5724-formatted messages, for example. The protocol host 104b is a social network host (e.g., Facebook®; Twitter® any other message, chat or discussion forum; etc.), which relies on a PHP Bulletin Board (PHPBB) protocol. And, the protocol host 104c is an email host (e.g., GMAIL®, etc.), which communicates through the SMTP protocol. That said, the protocol hosts 104a-c described herein are not limited to being one of these particular types of messaging hosts, as other messaging hosts and associated protocols may be employed in other system embodiments. For example, a protocol host may instead provide for, without limitation, Usenet newsgroups, email mailing lists, multimedia message services (MSSs), Internet Relay Chats (IRCs), instant messaging/chat services (e.g., Hipchat®, Slack®, Flowdock®, Google Hangouts®, Whatsapp®, Snapchat®, Skype®, Jabber® (e.g., based on XMPP, etc.), etc.), and various other like messaging type protocols, services, etc.

Figure 2:
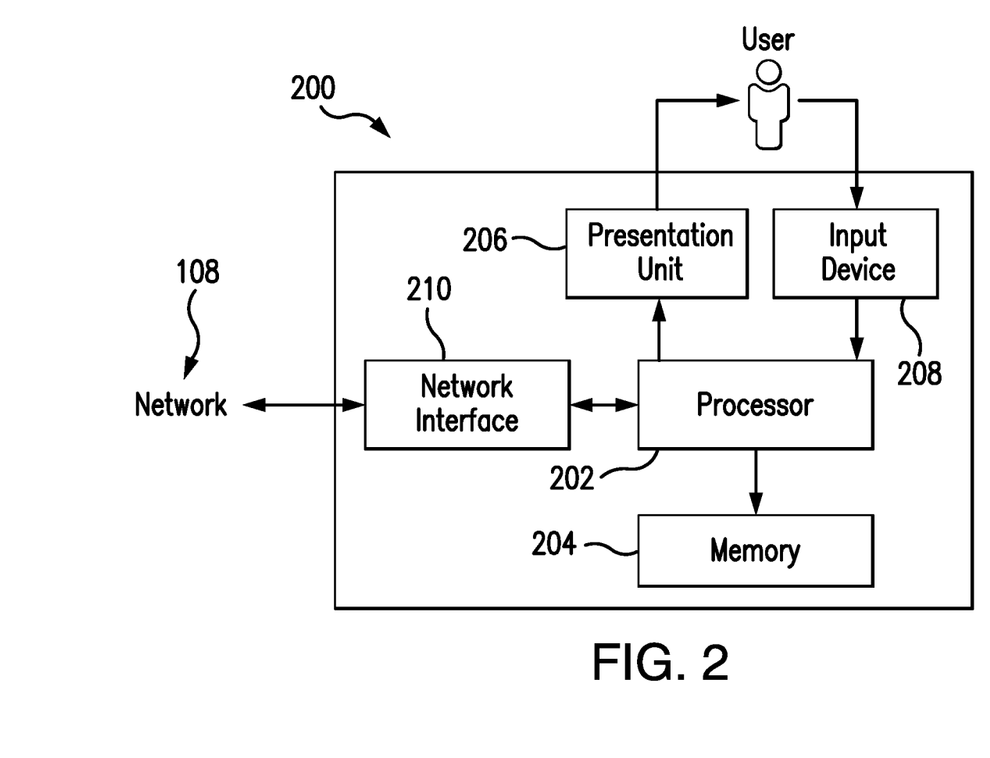
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to operate as described herein. In the exemplary embodiment of FIG. 1, each of the protocol hosts 104a-c includes, or is implemented in, a computing device 200 coupled to (and in communication with) the network 108. In addition, the source computing device 102 and the recipient computing device 106 may be considered computing devices consistent with computing device 200. However, the system 100 should not be considered to be limited to the computing device 200, as described below, as different computing devices and/or arrangements of computing devices may be used. In addition, different components and/or arrangements of components may be used in other computing devices. Further, it should be appreciated that the parts of the system 100 may include a single computing device (e.g., a single computing device 200, etc.), or multiple such computing devices located in close proximity or distributed over a geographic region.

Referring to FIG. 2, the exemplary computing device 200 includes a processor 202 and a memory 204 coupled (and in communication with) to the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, messages, protocols, configuration data, and/or other types of data suitable for use as described herein. Furthermore, in various embodiments, computer-executable instructions may be stored in the memory 204 for execution by the processor 202 to cause the processor 202 to perform one or more of the functions/operations described herein, such that the memory 204 is a physical, tangible, and non-transitory computer readable storage media. Such instructions often improve the efficiencies and/or performance of the processor 202 that is identifying and/or presenting scores to the user. It should be appreciated that the memory 204 may include a variety of different memories, each implemented in one or more of the functions or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., messages, etc.), either visually or audibly to a user of the computing device 200, for example, to recipient 112, etc. It should be further appreciated that various web-based interfaces (e.g., application interfaces, webpages, etc.) may be displayed at computing device 200, and in particular at presentation unit 206, to display information, such as, for example, messages, options for selecting message types, etc. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The computing device 200 also includes an input device 208 that receives inputs from the user (i.e., user inputs) such as, for example, selections of a recipient and/or selections of recipient identifiers for messages, a selection of a default message protocol for incoming messages, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 also includes a network interface 210 coupled to (and in communication with) the processor 202 and the memory 204 for facilitating communication between the computing device 200 and the network 108, for example. The network interface 210 may include, without limitation, a wired network adapter, a wireless network adapter, a mobile network adapter, or other device capable of communicating with one or more different networks, including the network 108. Further, in some exemplary embodiments, the computing device 200 includes the processor 202 and one or more network interfaces incorporated into or with the processor 202.

Referring again to FIG. 1, the system 100 includes a messaging center 114, which is configured, by executable instructions, to perform one or more of the operations described herein. Specifically, for example, the messaging center 114 is configured to interact with the source computing device 102, the protocol hosts 104a-c, and/or the recipient computing device 106, in order to facilitate message transfer from one to the other, regardless of the protocol in which a message is originated. The messaging center 114 includes at least one computing device, generally consistent, for example, with the computing device 200. With that said, while the messaging center 114 is illustrated as separate from the protocol hosts 104a-c in this embodiment, it may be integrated, in whole or in part, as illustrated by the dotted lines, as part of any one or more of the protocol hosts 104a-c in other system embodiments.

In this exemplary embodiment, the messaging center 114 includes three ingestion engines 116a-c, a message engine 118, and three dissemination engines 120a-c, each of which is defined by executable instructions, to perform as described herein. Each of the ingestion engines 116a-c is configured to receive a message from the source computing device 102, either directly, or via one of the protocol hosts 104a-c. In general, the ingestion engines 116a-c each define an API, which is called by the source computing device 102 and/or an associated one of the protocol hosts 104a-c. Each of the ingestion engines 116a-c, then, is further written and/or created according to the specific protocol of a message that may be received from a message source. As such, a specific one of the ingestion engines 116a-c is employed, per message, depending on the protocol host and/or the protocol of the message source. For example, a message consistent with the SMS protocol associated with the protocol host 104a will be received at the ingestion engine 116a. Similarly, a message consistent with the protocol associated with the protocol host 104b (e.g., a PHPBB protocol, etc.) will be received at ingestion engine 116b, and a message consistent with a protocol associated with protocol host 104c (e.g., an email protocol, etc.) will be received at ingestion engine 116c. With that said, in the illustrated embodiment the ingestion engines 116a-c may be implemented as shared objects (e.g., dynamic shared objects (DSOs), dynamic link libraries (DLLs), etc.) that are programmatically linked into runtime processes of the messaging center 114. In this way, the ingestion engines 116a-c and the message engine 118 may exist in a single process on a single node, for example. In other embodiments, however, the ingestion engines 116a-c may run on their own dedicated compute nodes (e.g., physical or virtual machines, etc.) and communicate via the network 108 to the message engine 118 to share information.

While in the illustrated system 100, one of the ingestion engines 116a-c at the messaging center 114 is included for each of the protocol hosts 104a-c, it should be appreciated that a different number of ingestion engines may be included, per protocol host, for example, in other system embodiments. In at least one embodiment, a single ingestion engine may be configured to receive messages from multiple protocol hosts, in the same or different protocols. Further, while the ingestion engines 116a-c each are specific to a protocol, the ingestion engines 116a-c may further include configuration data, such as, for example, addresses associated with the protocol hosts 104a-c (e.g., associated with an email server, a PHPBB website, an IRC server, a node name, etc.), which permit the ingestion engines 116a-c to perform as described herein.

As another example, SMS messaging generally exists in cellular networks (e.g., as part of the network 108, etc.). As such, configuration data that permits the messaging center 114, message engine 118, ingestion engine 116a, and/or dissemination engine 120a into the cellular networks may be necessary. In connection therewith, most cellular operators provide gateways that bridge a LAN or WAN onto their private cellular networks, or there are providers that interface with many networks and provide the service of handling that integration for clients. In such cases, an IP address of the gateways as well as credentials to permit access to the gateways would be included in the configuration data.

Other configuration data may relate to, for example, extracting recipient identifiers (e.g., designation numbers or addresses, etc.) when messages are sent to the ingestion engines 116a-c that are not part of an existing conversation; credentials and access information for various social networks; credentials and address information for inbound and outbound emails; etc. With that said, in general, the ingestion engines 116a-c will be configured to process a desired message format (e.g., identify the corresponding server, identify the security requirements, identify the authentication requirements, etc.).

It should be appreciated that, depending on the protocol involved, the ingestion engines 116a-c may be configured to receive messages via push or pull from the source computing device 102 and/or from the protocol hosts 104*a-c*. For example, the protocol host 104*b* may include a social network message forum, which is designed to deliver a message to the recipient 112 when the recipient 112 contacts the HTTP interface. As such, the ingestion engine 116*b*, for example, may be configured to retrieve (or pull) the message therefrom, thereby receiving the message from the protocol host 104*b*. Additionally, or alternatively, the protocol host 104*b* may, for example, be configure to send (or push) the message to the ingestion engine 116*b*. With reference to the above, as an example, the network address of the protocol host 104*b*, from which the message is pulled or pushed, may be included in the configuration data for the ingestion engine 116*b*.

With continued reference to FIG. 1, as a message is received at the ingestion engine 116*a*, for example, the message is consistent with a first protocol (e.g., an SMS protocol, etc.) that, generally, is a source protocol for the message. The message includes a recipient identifier for the recipient 112 (and/or the recipient computing device 106), which is indicative of a recipient for the message and/or a recipient protocol. In one implementation, the recipient identifier may include information (e.g., an email address, a username, a phone number, etc.), whereby the identifier is not only indicative of the recipient 112, but also indicative of the protocol in which the message is to be received. For example, the source user 110 may send an SMS message directed to the recipient 112 at the email address "john.smith@facebook.messaging-center.mydomain.com" in order to begin a Facebook® messenger conversation, whereby the email address identifies the recipient 112 (John Smith) and the "facebook.messaging-center" sub-domain is indicative of the recipient protocol. As in this example, the ingestion engine 116*a* and/or the message engine 118 will be able to identify a recipient, generally, from the recipient identifier. In another implementation, the source user 110 and/or the recipient 112 may be registered or otherwise known to the message engine 118, whereby the recipient 112 is able to designate a default and/or preferred protocol of messaging. In such an example, the source user 110 would only need to provide a recipient identifier associated with the recipient 112 which (itself) may or may not be indicative of the protocol by which the message is to be received by the recipient 112. For example, an email address may not be able to be included in the "TO" data of an SMS message in certain instances, but a phone number of the recipient, as the recipient identifier, may be included and associated with a default or preferred email protocol. Thereafter, the ingestion engine 116*a* and/or the message engine 118 would identify the default or preferred protocol associated with the recipient identifier (e.g., receive all messages as emails, receive messages from the source user 110 as emails, etc.).

In some embodiments, a recipient protocol may be identified, even where the recipient protocol is not explicitly indicated in the message from source user 110 or specified as a default or preferred protocol for the recipient. For example, the message engine 118 may be configured to embed "hints" (recognizable by the message engine 118) in messages received from the ingestion engines 116*a-c* prior to passing the messages to the appropriate dissemination engines 120*a-c*. For example, if the original message is sent to "Joe" via email that originated from social networking, the message engine 118 may automatically generate a thread ID metadata property to track the "conversation" for that topic if replies come back. In this case, a reply via email from "Joe" may contain the thread ID in the response header and can thus be used by the message engine 118 (e.g., after the particular SMTP ingestion engine converts the header to the internal representation of a thread ID stored in metadata). As such, the message engine 118 may "normalize" the internal representation of the message, whereby it is not necessary to rely on prior registration/preferences by/of the recipient 112 for message delivery, or a requirement that target transport data be embedded in other attributes.

In any case, the ingestion engine 116*a*, then, is configured to determine if the source protocol is the same as the recipient protocol. If so, the ingestion engine 116*a* is configured to pass the message to the recipient computing device 106, via the network 108, or to the associated one of the protocol hosts 104*a-c*, for delivery of the message to the recipient 112. If not, however, the ingestion engine 116*a* is configured to normalize the message to a common protocol (or format), and to contact the message engine 118 and provide the normalized message to the message engine 118. While the normalized format may include an appropriate format, underlying formats for a normalized message may include, for example and without limitation, the RFC3521 and/or RFC5322 formats.

In turn, when the source protocol is not the same as the recipient protocol, the message engine 118 is configured to receive the normalized message from the ingestion engine 116*a* and to store the normalized message in memory, for example, in a data structure 122 associated therewith (e.g., in memory 204, etc.). In this exemplary embodiment, the data structure 122 may include, for example, a Hadoop framework persistent storage, a Relational database management system (RDBMS), or a non-relational storage scheme, etc. Of course, in other embodiments, different frameworks for the data structure 122 may be employed. Also, while the message is stored by the message engine 118 in this embodiment, it should be appreciated that the message may be stored, in the data structure 122, instead by the ingestion engine 116*a* (or even by one of the dissemination engines 120*a-c*, as appropriate) in one or more other embodiments.

In addition, the message engine 118 is configured to store other incoming messages, from the ingestion engine 116*a* and from the other ingestion engines 116*b-c*, as appropriate, in a queue for handling generally in the order received (e.g., the queue includes messages waiting to be delivered, etc.). The message engine 118 may further be configured to prioritize messages, in the queue, based on the source protocol and/or the recipient protocol, which may, for example, help limit costs, etc. For example, in the case of SMS messages, the messaging center 114 may not be operating on a cellular network. As such, a commercial relationship might then be needed with a gateway service. Depending on the cost model for interfacing with the gateway service, it may be less expensive to open a single connection and deliver multiple messages rather than delivering many individual messages. Similarly, delivery of email messages may be more efficient if the email messages can be pipeline delivered rather than delivered as individual messages. Another benefit for such prioritization of messages may exist in connection with real-time messaging interfacing with asynchronous messaging. As can be appreciated, it may be advantageous for messages that are destined for a real-time chat system to be prioritized for immediate delivery, while messages coming from real-time chat systems destined for email systems may be delayed and a "batch" of such email messages over the past five minutes or so may then be delivered.

The message engine 118 may also be implemented with a message broker (e.g., IBM™ MQ, Apache™ Kafka, Apache™ Active MQ, etc.), which facilitates the flow of messages from each of the ingestion engines 116a-c and disseminates the messages to the appropriate ones of the dissemination engines 120a-c. Specifically, the message engine 118 may be configured to identify one of the dissemination engines 120a-c, which corresponds to the recipient protocol indicated in the given normalized message (e.g., the dissemination engine 120a may be configured to receive messages having an SMS recipient protocol, the dissemination engine 120b may be configured to receive messages having a protocol associated with PHPBB, and the dissemination engine 120c may be configured to receive messages having an email protocol, etc.).

In the above example, for the message received at the ingestion engine 116a, the recipient protocol may include a protocol consistent with a social network, so that the dissemination engine 120b is identified. In connection therewith, the message engine 118 is configured to then pass the message (i.e., the normalized message) to the identified dissemination engine 120b (e.g., via an API associated therewith, etc.). As described above, in passing the messages, the message engine 118 may be configured to maintain the message in a queue, from which messages are passed to the different dissemination engines 120a-c, as the respective one of the dissemination engines 120a-c becomes available.

It should be appreciated that, as generally described, the inbound message may contain all of the identification needed to allow for proper dissemination of the message (to the recipient 112, for example). However, in some instances (when this is not the case), the messaging center 114 (e.g., the message engine 118, etc.) may be explicitly configured to map a recipient address (e.g., common@ systemimplementation.com, etc.) to disseminate a message to a specific target(s). In this regard, the messaging center 114 may, for example, be integrated with other systems such as, for example (without limitation), a PHPBB web forum (e.g., "Parts for Sale" on the domain antiquecars.com, etc.), a Jabber chat room (e.g., "Antique Car Parts for Sale" on a private server mymessaging.local, etc.), and/or with an email service provided by an ISP (e.g., at mail.myprovider.com, utilizing the SMTP and/or IMAP protocols; etc.). Knowing that different ingestion engines are available (e.g., for each of the PHPBB, Jabber, and email protocols; etc.), a configuration can be particularly implemented (rather than automatically derived, for example, by parsing email headers or forum subjects to identify threads), such that configuration data may then create known associations that can direct how a message received at one of the ingestion engines 116a-c and/or at the message engine 118 is disseminated. For example, configuration data accessible by the message engine 118 may include associations for the email address "antique_car_parts_for_sale@ systemimplementation.com," "Parts for Sale" PHPBB web forum, and "Antique Car Parts for Sale" Jabber chat room.

In this example, when the message engine 118 receives a normalized message with "antique_car_parts_for_sale@ systemimplementation.com" in the "TO" field, from the ingestion engine 116c associated with the email protocol, the message engine 118 may be configured to identify the message as one that should be broadcast to one or more places (e.g., disseminated as plain text to the "Antique Car Parts for Sale" Jabber chat room via dissemination engine associated with the Jabber protocol and/or sent to the "Parts for Sale" PHPBB web forum (as either a reply to an existing conversation or as a new topic) via the dissemination engine 120b associated with the PHPBB protocol. Also in this example, when the message engine 118 receives a normalized message, from the ingestion engine 116b associated with the PHPBB protocol, directed as a post to the "Parts for Sale" PHPBB web forum, the message engine 118 may be configured to identify the message as one that should be broadcast to one or more places (e.g., immediately sent as plain text to the "Antique Car Parts for Sale" Jabber chat room, for all logged in users to read, via a dissemination engine associated with the Jabber protocol and/or sent via email (immediately or in batches) to forum users who have requested that form of correspondence, via the dissemination engine 120c associated with the email protocol. Further in this example, when message engine 118 receives a normalized message directed to the "Antique Car Parts for Sale" Jabber chat room, from the ingestion engine associated with the Jabber protocol, the message engine 118 may be configured to identify the message as one that should be broadcast to one or more places (e.g., posted to a specific thread/conversation in the PHPBB web forum "Parts for Sale," via the dissemination engine 120b associated with the PHPBB protocol, and also sent via email (immediately or, as discussed in more detail below, in batches) to forum users who have requested that form of correspondence, via the dissemination engine 120c associated with the email protocol.

It should be appreciated that the message engine 118 may be configured to use hooks or helpers by way of an implementation of a known API between the message engine 118 and one or more ingestion engines 116a-c and/or between the message engine 118 and one or more dissemination engines 120a-c. In this manner, the message engine 118 may be configured to obtain information that is not innate to the message engine 118 itself, such that the message engine 118 may, for example, enhance the metadata of a message received from the ingestion engines 116a-c, perform error control, and/or identify the appropriate dissemination engine 120a-c for a message received from the ingestion engines 116a-c, etc. It should also be appreciated that the use of hooks by the message engine 118 may involve an API between the message engine 118 and other components in the system 100, whereas the use by the message engine 118 of "hints" is internal to the message engine 118 in that the message engine 118 can generate and utilize "hints" on its own. It should further be appreciated that hooks may be invoked by the message engine 118 against any of the dissemination engines 120a-c and/or ingestion engines 116a-c (or other engines), whereby such engines are requested to provide or generate information for any applicable use by the message engine 118.

For example, in order to enhance the metadata of a message, the message engine 118 may, for instance, be configured to use a "generate_thread_id" hook, whereby the hook is invoked against one or more of dissemination engines 120a-c via the implementation of a known API to request that the dissemination engine generate a thread ID for the message where one does not exist. For instance, where the message engine 118 receives a normalized SMS message (that does not have a thread ID) from the ingestion engine 116a and the normalized SMS message is destined to be delivered in the form of an email via the email dissemination engine 120c, the message engine 118 may invoke the "generate_thread_id" hook, whereby the email dissemination engine 120c may generate an appropriate thread ID for the message/email and respond to the message engine 118 with the thread ID. The email dissemination engine 120c may generate an appropriate thread ID in any appropriate manner, including according to a setting from an administrator (e.g., "Communication from Message Exchange," etc.). The message engine 118, then, may include the thread ID generated by the email dissemination engine 120c in the message. It should be appreciated that where a hook does not result in a response from a dissemination engine 120a-c (or an ingestion engine 116a-c), the message engine 118 may still proceed with identifying, and/or passing the message to, a dissemination engine for delivery to a recipient. For instance, in the preceding example, if the email dissemination engine 120c does not generate a thread ID in response to the hook, the message engine 118 may use a "hint" by generating and including a thread ID in the metadata of the message (consistent with the above), or the message engine 118 may not include a thread ID at all.

As another example, in order to perform error control, the message engine 118 may, for instance, use a "can_message_be_sent" hook, whereby the hook is invoked against each of dissemination engines 120a-c via the implementation of a known API, with the message and metadata as inputs. Each of dissemination engines 120a-c, then, may be configured to respond to the message engine 118 in a manner indicating whether the dissemination engine can disseminate the message to the recipient with the amount of metadata available. If no dissemination engine can disseminate the message to the recipient, the message engine 118, then, may be configured to determine that more information is needed and/or that there is an error.

As a further example, where the message engine 118 receives a normalized message from an ingestion engine 116a-c and, for whatever reason, cannot determine on its own the appropriate dissemination engine to pass the message to, the message engine 118 may invoke a hook against each of the dissemination engines 120a-c (potentially, passing the message to each dissemination engine), whereby a dissemination engine may be configured to respond with an indication as to whether it is capable of disseminating the message. For instance, where the message engine 118 receives a normalized SMS message from ingestion engine 116a and the intended recipient is a PHPBB web forum, and the message engine 118 cannot determine the appropriate dissemination engine for the normalized SMS message (e.g., because of insufficient metadata in the normalized SMS message or an unrecognizable address in the "TO" field, etc.), the message engine 118 may invoke a hook against each of dissemination engines 120a-c to determine the appropriate dissemination engine and, potentially, other metadata for the message. Dissemination engine 120b, then, may be configured to respond to the message engine 118 with an indication that it is an appropriate dissemination engine 120b for the message and, potentially, with a thread ID for the message. In connection therewith, the message engine 118 may include the thread ID in the normalized SMS message and pass the message to dissemination engine 120b for dissemination to the intended PHPBB web form.

Figure 3:
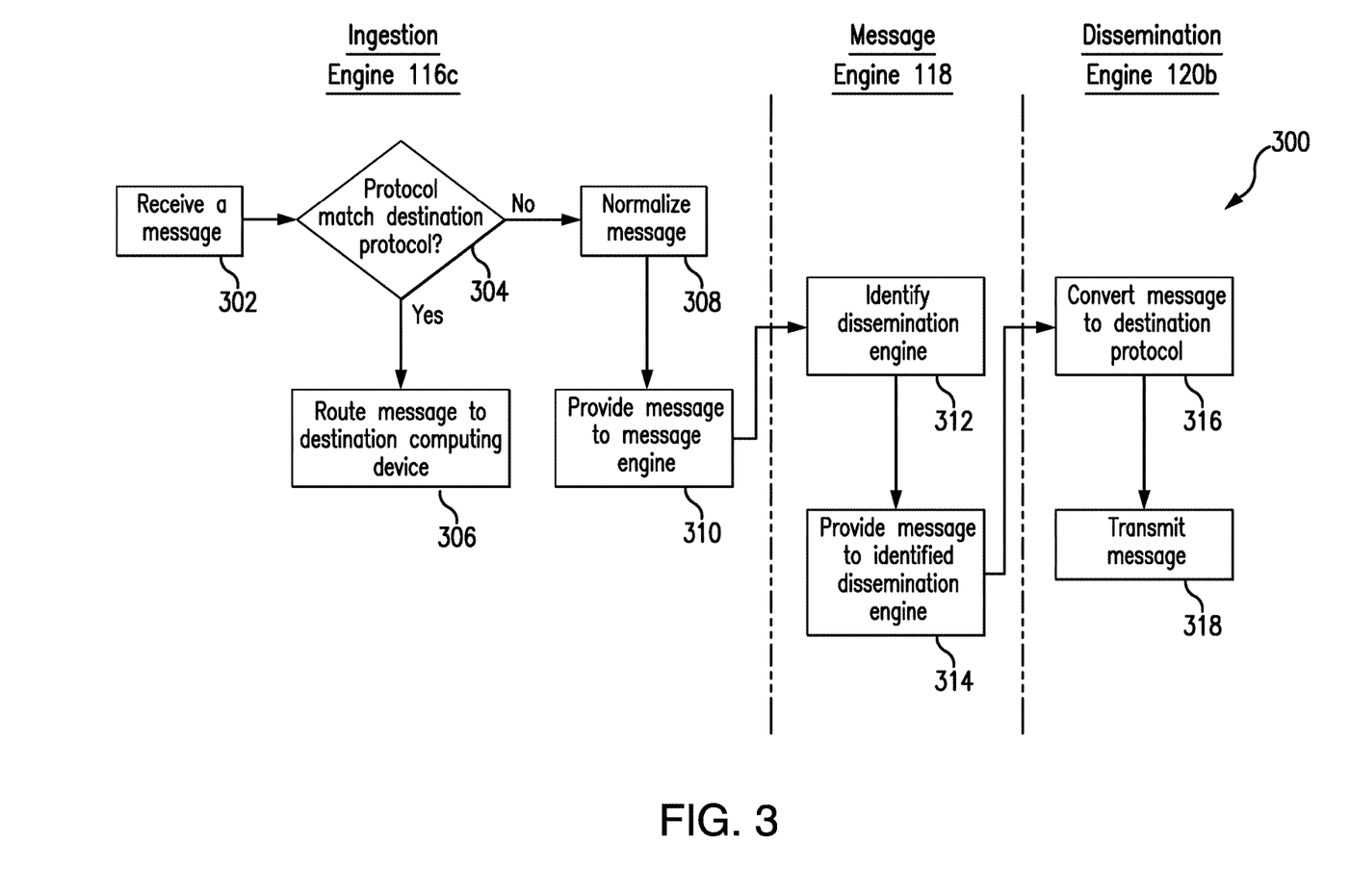
FIG. 3 illustrates an exemplary method for transmitting electronic messages from a source user, in one protocol, to a recipient, in another different protocol, suitable for use in the system of FIG. 1.

At this point, it should be appreciated that the system 100 (and the method 300 described below) allow for "decoupling" of the source of a message and the recipient(s) of the message such that a message in a source protocol may be delivered via a variety of recipient protocols, irrespective of whether a source particularly supports delivery of the message in the variety of protocols (e.g., in the example above, a message posted to the "Parts for Sale" PHPBB web form can be broadcast to users of the "Antique Car Parts for Sale" Jabber chat room, even if the PHPBB web forum was not designed to support delivery to a Jabber chat room, or to otherwise integrate with a Jabber chat room; etc.).

In addition, the message engine 118 may be configured, in connection with the queue, to batch multiple different messages together into a single message. Specifically, for example, a HipChat® message may be exchanged within the system 100 at a rapid rate, such as, for example, 1 message per 0.5 seconds over a three minute interval (e.g., as a conversation, etc.), as compared to email messages (which may be exchanged every two minutes). As such, for multiple email messages, the message engine 118 may be configured to batch the messages together, and pass the batched messages to the dissemination engine 120b, as a single message, while multiple Hipchat® message (in view of the expectant rate) would not be batched with other Hipchat® message. That said, in one or more embodiment, the message engine 118 may be configured to batch the multiple Hipchat® messages, and pass the batched Hipchat® messages to the dissemination engine 120b. In connection therewith, such batching may be done either at the ingestion engine 116a or at the dissemination engine 120b, since those are the components that are generally familiar with the protocols in use (and can thus make intelligent decisions on whether batching should or should not take place).

Subsequently, upon receipt of the message by the dissemination engine 120b, the dissemination engine 120b may be configured to convert the normalized message to a message consistent with the recipient protocol (associated with the PHPBB protocol in this example), and to transmit the message to the recipient computing device 106 and/or the protocol host 104b, as appropriate. Like the ingestion engine 116a, the dissemination engine 120b may include an API and/or may call an API for dissemination of the message to the appropriate recipient.

As should be understood, the messaging center 114 may be further configured to facilitate reply messaging from the recipient 112 of an original message. In order to provide for a reply, one of the ingestion engines 116a-c will be associated with the dissemination engine 120b from which the message was remitted, in order to receive the reply message, in a manner consistent with the above. That said, it is not necessary that a dissemination engine be associated with an ingestion engine, as to provide for such reply messages (and such bidirectional communication).

It should also be appreciated that the ingestion engines 116a-c and/or the dissemination engines 120a-c may be configured as necessary to send and/or receive messages and/or information. For example, ingestion engine 116a and/or dissemination engine 120a may be configured with the SMS gateway address for sending and/or receiving SMS messages; ingestion engine 116b and/or dissemination engine 120b may be configured with URLs for message boards and/or social networks and credentials for accessing the message boards and/or social networks, as well as polling intervals to check for new messages and/or posts on the message boards and/or social networks (e.g., on a message board located at www.domain.com/phpbb/car_chat); and ingestion engine 116c and/or dissemination engine 120c may be configured with mailserver addresses and credentials for sending messages.

Generally, it should be appreciated that the above description similarly applies to messages received at the ingestion engines 116b-c, and to messages having recipient protocols other than a PHPBB protocol. Further, while three ingestion engines 116a-c and three dissemination engines 120a-c are illustrated in FIG. 1, different numbers and/or different types of either may be included in other system embodiments. For example, the messaging center 114 may include a number of ingestion engines, but only one dissemination engine, thereby providing receipt of messages in different protocols and output of the messages (regardless of source protocols) in a single protocol.

In addition, it should be understood that the implementation shown in FIG. 1 provides for modularity within the messaging center 114, whereby, for example, the ingestion engines 116a-c, the message engine 118, and the dissemination engines 120a-c may be created and/or implemented separately (e.g., written in different languages, etc.). Moreover, depending on the particular implementation, the above may be combined in one or more manners, where the operations are maintained (or substantially maintained), but the specific divisions of the engines are not omitted. And, the messaging center 114 may be further configured for monitoring of message receipt and/or delivery, and also for queueing of messages received at or through the ingestion engines 116a-c or others.

FIG. 3 illustrates an exemplary method 300 for use in facilitating a communication between a source and at least one recipient. The method 300 is described with reference to the system 100, and in particular, as operations of the ingestion engines 116a-c, the message engine 118, the dissemination engines 120a-c, and the data structure 122, and also with reference to the computing device 200. That said, it should be appreciated that the methods described herein are not limited to the system 100 of FIG. 1 and/or the computing device of FIG. 2. And, conversely, the systems described herein are not limited to the exemplary method 300 of FIG. 3.

As part of the illustration of the method 300 of FIG. 3, it is assumed that the source user 110 is attempting to send an email message to a social network board associated with the recipient 112. The message is then in a protocol consistent with an email message and includes a screen name associated with the social network board that is specific to the recipient 112 (e.g., recipient@ socialnetwork.implementedsystem.com, etc.). As such, initially in this example, the source user 110 generates the email message via the computing device 102, which may include a smartphone, etc., with the "TO" part of the message including the screen name "recipient@ socialnetwork.implementedsystem.com" for the recipient 112, a subject including a topic of the message (e.g., "Congratulation on the new job!", etc.), and a body of the message including, for example, "Hi John, I heard about the new job. I did not know you were even looking. In any event, I really hope you like the new company. Congratulations!! Best Regards. Bob."

When the source user 110 completes the email message and presses send at the computing device 102, the message is sent by the protocol host 104c (as the email protocol host) and is received, at 302, at the ingestion engine 116c, which is associated with the email protocol host 104c. In connection therewith, the ingestion engine 116c receives (or is identified to receive) the email message, from the protocol host 104c, based on the email protocol upon which the originating email message is created. For instance, in the above example, the email message is directed to the recipient 112 via the screen name/address: "recipient@ socialnetwork.implementedsystem.com." The domain segment of this address includes the domain of the recipient host, or "implementedsystem.com" where "implementedsystem.com" then has an MX record for "socialnetwork" that routes the email message (or other messages received and directed thereto) to the domain to the ingestion engine 116c.

Upon receipt of the message, the ingestion engine 116c determines if the received message protocol, or source protocol (i.e., the email message protocol in this example), is consistent with the recipient protocol (i.e., the PHPBB protocol) for the message, at 304. In the above example, the ingestion engine 116c may identify the recipient protocol based on information included with the received email message. For example, the ingestion engine 116c may identify that a recipient protocol is the PHPBB protocol based on the inclusion of the "socialnetwork" identifier in the sub-domain of the email address "recipient@ socialnetwork.implementedsystem.com." The identified PHPBB protocol can then be used for determining if the source protocol is consistent with the recipient protocol. However, the ingestion engine 116c may, in at least one embodiment, additionally or alternatively, be configured to look up (e.g., in a database, etc.) preferred or default protocol information for the identified recipient (i.e., in this example, the user or "recipient" of "socialnetwork" identified in the sub-domain of the email address). If preferred or default recipient protocol information is located, the ingestion engine 116c may treat the preferred or default recipient protocol as the recipient protocol for purposes of determining if the source protocol is consistent with the recipient protocol.

As another example, when a user of a PHPBB forum would like to receive correspondence via email, a post to the forum (e.g., to "thread-1234" of the "car_chat" forum, etc.) may trigger an email to be sent to the user with "thread-1234@car_chat.systemimplementation.com" in the "FROM" field. When the user replies to that email, a message may be received by ingestion engine 116c with "thread-1234@car_chat.systemimplementation.com" in the "TO" field. The ingestion engine 116c may then identify a recipient protocol as the PHPBB protocol based on the inclusion of the thread ID "thread-1234" in the "TO" field, along with the inclusion of the "car_chat" forum identifier (which can also be used by dissemination engine 120b to identify "thread-1234" of the "car_chat" forum as the recipient of the message). As a further example, the ingestion engine 116c may be configured to associate a specific email address with a PHPBB forum, whereby when a user sends an email to that address (e.g., newpost@car_chat.systemimpelmentation.com), the ingestion engine 116c may determine that PHPBB is the recipient protocol, normalize the message (e.g., extracting the subject and body data as appropriate, etc.) and pass the normalized message to the message engine 118, whereafter the dissemination engine 120b can disseminate the message as a new post to the "car_chat" PHPBB forum.

In still another example, an SMS message may be received by ingestion engine 116a, which is associated with the SMS protocol host 104a. Upon receipt of the SMS message, the ingestion engine 116a may determine if the received message protocol, or source protocol (i.e., SMS protocol in this example), is consistent with the recipient protocol. As discussed above, the ingestion engine 116a may, in at least one embodiment, be configured to look up (e.g., in a database, etc.) preferred or default protocol information for the identified recipient (i.e., in this example, the recipient associated with the recipient phone number of the SMS message). Again, if preferred or default recipient protocol information is located, the ingestion engine 116a may treat the preferred or default recipient protocol as the recipient protocol for purposes of determining if the source protocol is consistent with the recipient protocol.

In a further example, an email message directed to the name/address "5554443333@mms.implementedsystem.com" may be received by ingestion engine 116c. Upon receipt of the email message, the ingestion engine 116c determines if the received message protocol, or source protocol (i.e., email protocol in this example), is consistent with the recipient protocol. As discussed above, the ingestion engine 116c may identify a recipient protocol based on information included with the received email message. For example, the ingestion engine 116c may identify that a recipient protocol is the MMS protocol based on the inclusion of the "mms" identifier in the sub-domain of the email address "5554443333@mms.implementedsystem.com." The identified MMS protocol can then be used for determining if the source protocol is consistent with the recipient protocol. However, the ingestion engine 116c may, in at least one embodiment, additionally or alternatively, be configured to look up (e.g., in a database, etc.) preferred or default protocol information for the identified recipient (i.e., in this example, the recipient associated with the 5554443333 phone number identified in the email address). Again, if preferred or default recipient protocol information is located, the ingestion engine 116c may treat the preferred or default recipient protocol as the recipient protocol for purposes of determining if the source protocol is consistent with the recipient protocol.

If the ingestion engine 116c determines that the source protocol is the same as or matches the recipient protocol, the ingestion engine 116c routes, at 306, the message toward the recipient computing device 106 of the recipient 112, either directly, via the network 108, or via the protocol host 104c. For instance, if an email message is directed to the recipient 112 via the screen name/address "recipient@ socialnetwork.implementedsystem.com" and the ingestion engine 116c is configured to look up in a database preferred or default protocol information for the identified recipient (i.e., in this example, the user or "recipient" of "socialnetwork" identified in the sub-domain of the email address), and the database indicates that email protocol is the preferred or default protocol for recipient 112, the ingestion engine 116c will route, at 306, the message toward the recipient computing device 106 of the recipient 112, either directly, via the network 108, or via the protocol host 104a.

Conversely, if the ingestion engine 116c determines that the source protocol of the received message is not a match for the recipient protocol, as in the example above where the email message is directed to the recipient 112 via the screen name/address "recipient@ socialnetwork.implementedsystem.com" and default or preferred protocol information does not exist and/or indicates the PHPBB protocol, the ingestion engine 116c normalizes, at 308, the message and provides, at 310, the message to the message engine 118. In particular, a normal protocol is defined for all messages, which may be independent of the source protocol and/or the recipient protocol. The normal protocol may be consistent with one of the protocols of the ingestion or dissemination engines, or may be a different protocol. In general, the normal protocol may be selected to be the most common protocol of message (thereby limiting "normalization" of messages), or may be selected for ease of use of the protocol, or may be selected for other reasons (as long as both the ingestion engines and the dissemination engines understand it). That said, the normalized protocol will include data for substantially all the content included in one or more messages to be passed through the message engine 118. For example, the normal protocol will define, for each message, TO, FROM, and CONTENT. The normal protocol may further include SUBJECT and other data, as needed or desired. For example, normalization of the message may define data (in one form or another) to allow for reply message. For example, for a message from social network protocol host 104b to the email protocol host 104c, normalizing the message may include modifying the message to include TO: name@company.com and/or FROM: name@facebook. systemimplementation.com. Thus, if/when the message is replied to via email (as described below), it will be sent to the facebook.systemimplementation.com email protocol host 104c. Upon receipt of this reply, the ingestion engine 116c will identify that the message is destined for the Facebook® social media dissemination engine. It should be appreciated that this is only one example related to normalization, and that, in general, normalization may incorporate and/or account for metadata that is internal to the particular hosts (and the messaging center 114) that can provide insight for the messaging center 114, and its parts, to handle the message.

In this exemplary embodiment, the ingestion engine 116c normalizes the message, for the message engine 118, to JMS or Java Message Service, which is then received and stored by the message engine 118 in the data structure 122, an Apache ActiveMQ server, in this exemplary embodiment.

After the normalized message is received, the message engine 118 identifies, at 312, the particular one of the dissemination engines 120a-c through which the message is to be transmitted. Specifically, for example, the message engine 118 may determine, based on the recipient identifier for the message and/or the recipient protocol, the protocol in which the message is to be transmitted, and identify the particular one of the dissemination engines 120a-c that corresponds thereto. For example, the message engine 118 may determine the protocol in which the message is to be transmitted consistent with the methodology discussed above in relation to operation 304. In the above example, the message engine 118 relies on the address "recipient@ socialnetwork.messagingsystem.com" as corresponding to the social network protocol (e.g., as indicated by the social network domain in the address (i.e., a special DNS domain name), etc.), and as such, identifies, at 312, the social network dissemination engine 120b. It should be appreciated that users may authorize the dissemination engine 120b to post messages to social networks and/or forums on their behalf (e.g., via the Facebook API, etc.). Once authorized by a user, a token may be generated and stored by the system to facilitate access to the user's social network and/or forum account. It should be appreciated that the token may reside in a database shared by a dissemination engine and ingestion engine and be used by both engines (e.g., so that the ingestion engine 116b can access posts directed to the user, etc.).

In another example, a normalized message may be received by the message engine 118 from ingestion engine 116c with "henry@mms.messagingsystem.com" in a "TO" field. The message engine 118 may rely on the "mms" sub-domain in the address "henry@mms.messagingsystem.com" as corresponding to the MMS protocol, and as such, identify an MMS dissemination engine. In a further scenario, a normalized message may be received by the message engine from an MMS ingestion engine with "henry@emaildomain.com" in a "TO" field. The message engine 118 may rely on the "emaildomain" in the domain of the address henry@emaildomain.com as corresponding to email protocol, and as such, identify the email dissemination engine 120c.

As a further example, a normalized message may be received by the message engine 118 from an MMS ingestion engine with david.smith@facebook.messagingsystem.com or "thread-1234+david.smith@facebook.com in the "TO" field. The message engine 118 may similarly rely on the information in the TO field to identify a dissemination engine associated with the Facebook® social media protocol.

Going back to the example where the message engine 118 relies on the address "recipient@ socialnetwork.messagingsystem.com" as corresponding to the social network protocol, the message engine 118 then provides, at 314, the message (i.e., the normalized message) to the identified dissemination engine 120b, for example, through an API call to the dissemination engine 120b (in this example). The dissemination engine 120b, in turn, converts the normalized message to the destination protocol, at 316. In this example, the dissemination engine 120b converts the normalized message to the protocol associated with the protocol host 104b. Specifically, the dissemination engine 120b maps common components in the message that must exist such as who the message is from and to whom the message is intended to be delivered (as provided in the normalized protocol). The dissemination engine 120b then applies optional values that are able to be preserved between message formats (e.g., SUBJECT: from SMTP email to title of social network post) and as well as associated metadata such as a thread, conversation or discussion identifier (e.g., subject metadata for email, thread unique ID metadata for a PHPBB forum, or thread unique ID metadata for Flowdock or Slack, etc.), included with the message received by ingestion engine 116c, for easier reply mapping.

Other operations may be taken by the dissemination engine 120b specific to the protocol and media format of the message being delivered. For example, an SMS message cannot exceed 160 characters so the dissemination engine 120a may perform a break the message up into multiple parts (i.e., break-up operation), when exceeding this limit. Other operations may include stripping images from HTML content and replacing them with the alt tag for chat protocol host that do not support images, etc. As a further example, if an email message containing embedded HTML is destined for a message board, the message board host may reject the message or may "sanitize" the message in a way that would make the HTML code visible in the message, thus making the message difficult to read. As such, the dissemination engine 120b may remove the embedded HTML code to avoid rejection or sanitization.

Thereafter, the dissemination engine 120b transmits the message along to the computing device 106 of the recipient 112, at 318. Specifically, in this example, the dissemination engine 120b communicates the message to the protocol host 104b, which, in turn, causes the message to be posted to one or more social network boards and/or profiles associated with the recipient 112. As such, the message is then viewable by the recipient 112, at the computing device 106. Upon confirmation of such delivery, the message is deleted from the data structure 122. The message thus persists in the data structure 122 for a period of time sufficient to provide confidence in the delivery of the message before it is deleted. In at least one embodiment, the message persists in the data structure 122 until a confirmation of the message receipt is received at the dissemination engine 120b, for example, whereupon the message is deleted. Most messaging hosts will acknowledge a message almost immediately. For example, an SMTP server will usually reply with the internal message ID after it has accepted the message. Most APIdriven hosts will also reply with success or fail messages.

Upon viewing the message at the computing device 106, the recipient 112 may decide to reply. In so doing, the reply message is compiled and sent, with the recipient 112 becoming the source user 110 (and the source user 110 becoming the recipient 112). The messaging center 114 then participates in the transfer of the message, again, as described above.

In view of the above, the systems and methods herein provide translation of a message protocol to any, supported, other message protocol, through use of the ingestion engines 116a-c, the message engine 118, and the dissemination engines 120a-c. Accordingly, a source user is permitted to send a message to a recipient, where the message is initially of a type convenient and/or preferred to the source user, and the recipient is able to later receive the message as a different type convenient and/or preferred to the recipient. In this manner, independence of both the recipient and the source user is provided for, and accommodated, by the supported different types of messaging protocols and translation there between.

As previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a message in a source protocol, the message including a recipient identifier associated with a recipient of the message; (b) determining, by a computing device, whether the source protocol of the received message matches a recipient protocol of the message; (c) when the recipient protocol of the message matches the source protocol for the message, forwarding the message, according to the recipient identifier, to the recipient; and (d) when the recipient protocol of the message does not match the source protocol for the message: (i) normalizing the message to a common protocol; (ii) converting the normalized message to the recipient protocol; and (iii) transmitting the converted message, in the recipient protocol, to the recipient, whereby the message is translated from the source protocol to the recipient protocol with the recipient protocol being different than the source protocol, to permit receipt by the recipient.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in communicating a message from a source, in one of multiple protocols, to a recipient, in a different one of the multiple protocols, the system comprising:

at least one computing device including a memory, the memory having computer-executable instructions defining multiple ingestion engines, a message engine, and multiple dissemination engines, each of the multiple ingestion engines associated with one source protocol, different than the source protocol for the other ones of the multiple ingestion engines;

wherein each of the multiple ingestion engines, when the computer-executable instructions associated therewith are executed, causes the at least one computing device to:

receive a message in the source protocol, for the ingestion engine, from a source, the message including a recipient identifier associated with a recipient of the message;

when a recipient protocol of the message matches, based on the recipient identifier, the source protocol for the message, forward the message according to the recipient identifier to the recipient; and when the recipient protocol of the message is different from the source protocol for the message:

normalize the message to a common protocol; and provide the normalized message to the message engine;

wherein the message engine, when the computer-executable instructions associated therewith are executed, causes the at least one computing device to:

receive the normalized message from each of the multiple ingestion engines;

store the normalized message in the memory;

identify, based on the recipient identifier included in the message, one of the multiple dissemination engines, the one of the multiple dissemination engines associated with the recipient protocol; and pass the normalized message to the one of the multiple dissemination engines; and wherein the identified one of the multiple dissemination engines, when the computer-executable instructions associated therewith are executed, causes the at least one computing device to:

convert the normalized message to the recipient protocol; and transmit the converted message, in the recipient protocol, to the recipient, whereby the message is translated from the source protocol to the recipient protocol with the recipient protocol being different than the source protocol, to permit receipt by a recipient.

2. The system of claim 1, wherein the source protocols associated with the ingestion engines include an email protocol, a short-message-service (SMS) protocol and a social network protocol.

3. The system of claim 1, wherein the message engine, when the computer-executable instructions associated therewith are executed, causes the at least one computing device to identify the one of the multiple dissemination engines based on a preference of the recipient associated with the recipient identifier.

4. The system of claim 1, wherein the message engine, when the computer-executable instructions associated therewith are executed, further causes the at least one computing device to:

delete the normalized message from the memory, after the normalized message is transmitted to the one of the multiple dissemination engines and/or after confirmation of receipt in response to transmitting the converted message from the recipient.

5. The system of claim 1, wherein the message engine, when the computer-executable instructions associated therewith are executed, further causes the at least one computing device to:

store the normalized message in a first queue in the memory, prior to identifying the one of the multiple dissemination engines for the message; and store the normalize message in a second queue associated with the recipient protocol, prior to passing the message to the identified one of the multiple dissemination engine.

6. The system of claim 5, wherein the second queue comprises at least one other normalized message; and
wherein the message engine, when the computer-executable instructions associated therewith are executed, further causes the at least one computing device to:
batch the normalized message, with the at least one other normalized message, in the second queue prior to transmitting the converted message to the recipient, whereby transmitting the converted message includes transmitting multiple converted messages to one or more recipients, the one or more recipients including said recipient of the message.

7. The system of claim 6, wherein the second queue is associated with an ActiveMQ™ message server.

8. The system of claim 1, wherein each of the multiple ingestion engines, when the computer-executable instructions associated therewith are executed, causes the at least one computing device to retrieve the message from a protocol host, in order to receive the message in the source protocol.

9. The system of claim 1, wherein each of the multiple dissemination engines is associated with one recipient protocol, different than the recipient protocol for the other ones of the multiple dissemination engines; and
wherein recipient protocols associated with the dissemination engines include an email protocol, a short-message-service (SMS) protocol and a social network protocol.

10. A computer-implemented method for communicating a message from a source, in one of multiple protocols, to a recipient, in a different one of the multiple protocols, the method comprising:
receiving a message in a source protocol, the message including a recipient identifier associated with a recipient of the message;
determining, by a computing device, whether the source protocol of the received message matches a recipient protocol of the message;
when the recipient protocol of the message matches the source protocol for the message, forwarding the message, according to the recipient identifier, to the recipient; and
when the recipient protocol of the message does not match the source protocol for the message:
normalizing the message to a common protocol;
converting the normalized message to the recipient protocol; and
transmitting the converted message, in the recipient protocol, to the recipient, whereby the message is translated from the source protocol to the recipient protocol with the recipient protocol being different than the source protocol, to permit receipt by the recipient.

11. The computer-implemented method of claim 10, wherein the source protocol includes one of: an email protocol, a short-message-service (SMS) protocol, and a social network protocol.

12. The computer-implemented method of claim 10, wherein determining whether the source protocol for the message matches a recipient protocol of the message comprises determining whether the source protocol matches a preferred or default protocol associated with the recipient.

13. The computer-implemented method of claim 10, wherein converting the normalized message to the recipient protocol comprises converting the normalized message to a preferred or default protocol associated with the recipient.

14. The computer-implemented method of claim 10, further comprising, when the recipient protocol of the message does not match the source protocol for the message:
storing the normalized message in a memory; and
deleting the normalized message from the memory, upon confirmation that the recipient is in receipt of the transmitted converted message.

15. The computer-implemented method of claim 14, further comprising storing the normalized message in a queue in the memory, prior to converting the normalized message to the recipient protocol;
wherein the queue comprises a plurality of messages normalized according to the common protocol.

16. The computer-implemented method of claim 10, further comprising:
batching the normalized message with at least one other message, prior to converting the normalized message to the recipient protocol, the at least one other message normalized according to the common protocol;
wherein the normalized message and the at least one other message are each associated with the same recipient protocol; and
wherein converting the normalized message to the recipient protocol comprises converting the normalized message to the recipient protocol and converting the at least one other message to the same recipient protocol.

17. The computer-implemented method of claim 10, wherein receiving the message in the source protocol includes receiving the message from a protocol host.

18. The computer-implemented method of claim 17, wherein the protocol host includes at least one of: an email host, a short-message-service (SMS) host, a social network host, a chat host, and bulletin board host.

19. A non-transitory computer readable storage media comprising executable instructions for communicating a message from a source to a recipient that, when executed by at least one processor, cause the at least one processor to:
receive a message in one of multiple source protocols, the message including a recipient identifier associated with a recipient of the message;
determine whether the one of the multiple source protocols matches a recipient protocol of the message;
when a recipient protocol of the message matches the source protocol for the message, forward the message, according to the recipient identifier, to the recipient; and
when the recipient protocol of the message does not match the source protocol for the message:
normalize the message to a common protocol;
convert the normalized message to the recipient protocol; and
transmit the converted message, in the recipient protocol, to the recipient, whereby the message is translated from the source protocol to the recipient protocol with the recipient protocol being different than the source protocol, to permit receipt by the recipient.

20. The non-transitory computer readable storage media of claim 19, wherein the executable instructions, when executed by the at least one processor, cause the at least one processor to receive the message in the one of multiple source protocols from a protocol host, the protocol host including at least one of: an email host, a short-message-service (SMS) host, a social network host, a chat host, and bulletin board host.

\* \* \* \* \*